(12) United States Patent
Chen et al.

(10) Patent No.: US 10,823,498 B2
(45) Date of Patent: Nov. 3, 2020

(54) CONTROLLING A REFRIGERATION UNIT IN RESPONSE TO A SPECIFIC CARGO LOAD

(71) Applicant: Carrier Corporation, Palm Beach Gardens, FL (US)

(72) Inventors: Yu H. Chen, Manlius, NY (US); Giorgio Rusignuolo, Manlius, NY (US); Marc Beasley, Beverly, MA (US); Luke DiMaggio, Anderson, SC (US); Kartik Kumar, Voorburg (NL)

(73) Assignee: CARRIER CORPORATION, Palm Beach Gardens, FL (US)

( * ) Notice: Subject to any disclaimer, the term of this patent is extended or adjusted under 35 U.S.C. 154(b) by 50 days.

(21) Appl. No.: 16/062,960

(22) PCT Filed: Dec. 12, 2016

(86) PCT No.: PCT/US2016/066058
§ 371 (c)(1),
(2) Date: Jun. 15, 2018

(87) PCT Pub. No.: WO2017/106059
PCT Pub. Date: Jun. 22, 2017

(65) Prior Publication Data
US 2019/0003765 A1  Jan. 3, 2019

Related U.S. Application Data

(60) Provisional application No. 62/269,278, filed on Dec. 18, 2015.

(51) Int. Cl.
F25D 29/00 (2006.01)
B60H 1/00 (2006.01)
B60P 3/20 (2006.01)

(52) U.S. Cl.
CPC ....... F25D 29/005 (2013.01); B60H 1/00014 (2013.01); B60H 1/00364 (2013.01);
(Continued)

(58) Field of Classification Search
CPC ............. G01K 1/026; G01K 2003/145; G01K 2213/00; G05D 23/1928; F25D 2700/123; F25D 29/008
See application file for complete search history.

(56) References Cited

U.S. PATENT DOCUMENTS 4,419,866 A    12/1983  Howland
5,161,383 A    11/1992  Hanson et al.
(Continued)

FOREIGN PATENT DOCUMENTS

CN    202661861 U    1/2013
EP    2105688 A2    9/2009

OTHER PUBLICATIONS

Identec Solutions, "Ports & Terminals Solution Overview Reefer Asset Management System" available at: https://www.identecsolutions.com/wp-content/uploads/2012/09/IDENTEC-SOLUTIONS_RAMS-reefer-asset-management-system.pdf, accessed Oct. 20, 2015, 4 pages.

(Continued)

Primary Examiner — Filip Zec
(74) Attorney, Agent, or Firm — Cantor Colburn LLP

(57) ABSTRACT

A method and system to control a refrigeration unit (104) in response to a cargo load (108) in a refrigerated container includes providing a plurality of sensors disposed within the refrigerated container, providing a cargo load temperature range and a cargo load excursion time limit corresponding to the cargo load, receiving a plurality of temperature readings corresponding to the cargo load via the plurality of sensors, operating the refrigeration unit in a power saving mode in
(Continued)

response to the plurality of temperature readings within the cargo load temperature range, and operating the refrigeration unit in a standard mode in response to the plurality of temperature readings outside the cargo load temperature range for longer than the cargo load excursion time limit.

5 Claims, 4 Drawing Sheets

(52) U.S. Cl.
CPC ..... *B60H 1/00878* (2013.01); *B60H 1/00964* (2013.01); *B60P 3/20* (2013.01); *F25D 29/00* (2013.01); *F25D 29/003* (2013.01); *F25D 29/006* (2013.01); *F25D 2600/06* (2013.01); *F25D 2700/12* (2013.01); *F25D 2700/16* (2013.01)

(56) References Cited

U.S. PATENT DOCUMENTS

| | | | |
|---|---|---|---|
| 6,095,427 A | 8/2000 | Hoium et al. | |
| 6,679,074 B2 | 1/2004 | Hanson | |
| 6,829,523 B2 | 12/2004 | Hanson | |
| 6,862,499 B1 | 3/2005 | Cretella et al. | |
| 7,937,962 B2 | 5/2011 | Dudley et al. | |
| 8,374,824 B2 | 2/2013 | Schwiers et al. | |
| 8,527,098 B2* | 9/2013 | Burton | G05D 23/1931 700/276 |
| 8,538,585 B2 | 9/2013 | Thogersen et al. | |
| 8,560,127 B2* | 10/2013 | Leen | G05D 19/02 700/278 |
| 8,959,036 B2 | 2/2015 | Huat | |
| 9,140,489 B2 | 9/2015 | Duraisamy et al. | |
| 9,300,138 B2* | 3/2016 | Chen | H02J 3/14 |
| 9,766,004 B2* | 9/2017 | Gan | F25D 29/00 |
| 2005/0081551 A1* | 4/2005 | Dail | A47F 3/0443 62/298 |
| 2005/0126189 A1 | 6/2005 | Salama | |
| 2006/0042296 A1 | 3/2006 | Ludwig et al. | |
| 2012/0095614 A1* | 4/2012 | DeLayo | F24D 12/02 700/300 |
| 2012/0111044 A1 | 5/2012 | Chen et al. | |
| 2013/0283826 A1 | 10/2013 | Burnham et al. | |

OTHER PUBLICATIONS

International Search Report and Written Opinion for application PCT/US2016/066058, dated Mar. 16, 2017, 14 pages.

Maersk Line, "Controlled Atmosphere", available at: http://maersklinereefer.com/equipment-services/special-services, accessed Oct. 20, 2015, 3 pages.

\* cited by examiner

CONTROLLING A REFRIGERATION UNIT IN RESPONSE TO A SPECIFIC CARGO LOAD

DESCRIPTION OF RELATED ART

The subject matter disclosed herein relates to controlling a refrigeration unit, and to a system and a method for controlling a refrigeration unit in response to a specific cargo load.

Typically, cold chain distribution systems are used to transport and distribute temperature sensitive and perishable goods. For example, products such as food and pharmaceuticals may be susceptible to temperature, humidity, contaminants, and other environmental factors. Advantageously, cold chain systems allow perishable and environmentally sensitive goods to be effectively transported and distributed without damage or other undesirable effects.

Various types of cargo can be transported by cold chain systems, wherein specific types of cargo have varying required temperature ranges and temperature sensitivities. Refrigeration units within cold chain systems may operate without consideration of the characteristics of the cargo being transported or stored. A system and method that can control a refrigeration unit in response to a specific cargo load is desired.

BRIEF SUMMARY

According to an embodiment, a method to control a refrigeration unit in response to a cargo load in a refrigerated container includes providing a plurality of sensors disposed within the refrigerated container, providing a cargo load temperature range and a cargo load excursion time limit corresponding to the cargo load, receiving a plurality of temperature readings corresponding to the cargo load via the plurality of sensors, operating the refrigeration unit in a power saving mode in response to the plurality of temperature readings within the cargo load temperature range, and operating the refrigeration unit in a standard mode in response to the plurality of temperature readings outside the cargo load temperature range for longer than the excursion time limit.

In addition to one or more of the features described above, or as an alternative, further embodiments could include identifying the cargo load via a cargo identification interface.

In addition to one or more of the features described above, or as an alternative, further embodiments could include retrieving the cargo load temperature range and the cargo load excursion time limit corresponding to the cargo load via a cargo database.

In addition to one or more of the features described above, or as an alternative, further embodiments could include analyzing at least one of a cargo thermal sensitivity, a cargo specific heat, and a cargo thermal mass corresponding to the cargo load via the processor.

In addition to one or more of the features described above, or as an alternative, further embodiments could include that at least one sensor of the plurality of sensors is an infrared temperature sensor.

In addition to one or more of the features described above, or as an alternative, further embodiments could include that at least one sensor of the plurality of sensors is a surface temperature sensor.

According to an embodiment, a system to control a refrigeration unit in response to a cargo load in a refrigerated container includes a plurality of sensors disposed within the refrigerated container, the plurality of sensors to provide a plurality of temperature readings, a processor to operate the refrigeration unit in a power saving mode in response to the plurality of temperature readings within the cargo load temperature range and to operate the refrigeration unit in a standard mode in response to the plurality of temperature readings outside the cargo load temperature range for longer than the excursion time limit.

In addition to one or more of the features described above, or as an alternative, further embodiments could include a cargo identification interface to identify the cargo load.

In addition to one or more of the features described above, or as an alternative, further embodiments could include a cargo database including the cargo load temperature range and the cargo load excursion time limit corresponding to the cargo load.

In addition to one or more of the features described above, or as an alternative, further embodiments could include that the processor analyzes at least one of a cargo thermal sensitivity, a cargo specific heat, and a cargo thermal mass corresponding to the cargo load.

In addition to one or more of the features described above, or as an alternative, further embodiments could include that at least one sensor of the plurality of sensors is an infrared temperature sensor.

In addition to one or more of the features described above, or as an alternative, further embodiments could include that at least one sensor of the plurality of sensors is a surface temperature sensor.

Technical function of the embodiments described above includes providing a cargo load temperature range and a cargo load excursion time limit corresponding to the cargo load, receiving a plurality of temperature readings corresponding to the cargo load via the plurality of sensors, operating the refrigeration unit in a power saving mode in response to the plurality of temperature readings within the cargo load temperature range, and operating the refrigeration unit in a standard mode in response to the plurality of temperature readings outside the cargo load temperature range for longer than the excursion time limit.

Other aspects, features, and techniques of the embodiments will become more apparent from the following description taken in conjunction with the drawings.

BRIEF DESCRIPTION OF THE SEVERAL VIEWS OF THE DRAWINGS

The subject matter is particularly pointed out and distinctly claimed in the claims at the conclusion of the specification. The foregoing and other features, and advantages of the embodiments are apparent from the following detailed description taken in conjunction with the accompanying drawings in which like elements are numbered alike in the several FIGURES:

DETAILED DESCRIPTION

Figure 1:
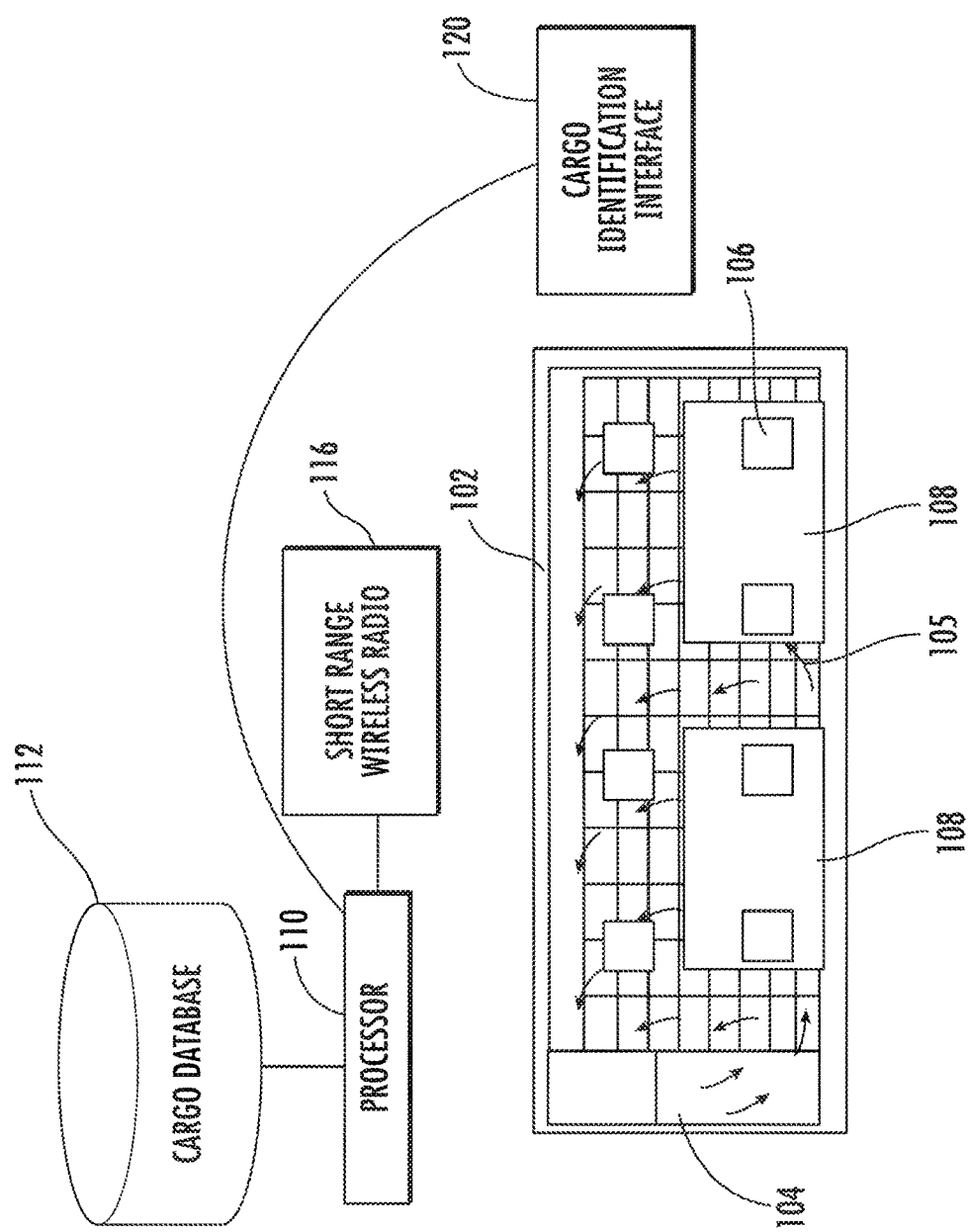
FIG. 1 illustrates a schematic view of a refrigeration unit control system.

Referring now to the drawings, FIG. 1 illustrates a schematic view of a refrigeration unit control system 100. In the illustrated embodiment, the refrigeration unit control system 100 includes a refrigerated container 102, a refrigeration unit 104, sensors 106, cargo load 108, a processor 110, a cargo database 112 and a cargo identification interface 120. In the illustrated embodiment, the refrigeration unit control system 100 can control the refrigeration unit 104 in response to the cargo load 108 to optimize energy consumption. Advantageously, the refrigeration unit control system 100 can minimize energy consumption while maintaining cargo loads 108 integrity by determining the thermal demands of the cargo loads 108.

In the illustrated embodiment, the cargo load 108 is transported or stored within the refrigerated container 102, wherein the refrigeration unit 104 can control the temperature of the cargo load 108. In the illustrated embodiment, the cargo load 108 includes any suitable product. In certain embodiments, the cargo load 108 includes perishable products such as meat, fruit, vegetables, drugs, blood, etc. that may be transported via a cold chain system. In the illustrated embodiment, the cargo load 108 is a temperature sensitive cargo, including, but not limited to food, drugs, blood, and other temperature sensitive materials.

In the illustrated embodiment, the cargo load 108 and elements within the cargo load 108 have a thermal mass that can act as a thermal accumulator. In certain embodiments, the thermal accumulation properties of the cargo load 108 allow the cargo load 108 to maintain a cargo temperature as well as affect a surrounding air temperature. Accordingly, in certain embodiments, the thermal mass of the cargo load 108 changes temperatures slower or faster than the surrounding air of within the refrigerated container 102 or cargo loads 108 consisting of other elements within. In the illustrated embodiment, certain cargo loads 108 are less sensitive to air temperatures within the refrigerated container 102 that other cargo loads 108, allowing certain cargo loads 108 to be more tolerant of wider air temperature ranges for longer periods of time than other cargo loads 108.

In certain embodiments, the composition or characteristics of elements within the cargo load 108 may alter the thermal sensitivity of the cargo load 108. Certain cargo loads 108 may have the ability to remain undamaged or unchanged over a wide range of cargo temperatures for a long period of time, while other cargo loads may become damaged or altered if the cargo load 108 experiences a cargo temperature excursion for a brief period of time. In the illustrated embodiment, the processor 110 can identify the demands of cargo loads 108 within the refrigerated container 102 to determine an optimal power strategy to prevent damage to the cargo load 108 while minimizing energy usage.

In the illustrated embodiment, the refrigeration unit 104 provides refrigerated, dehumidified, or otherwise climate controlled air to the volume of the refrigerated container 102. In the illustrated embodiment, climate controlled airflow 105 is utilized to control the temperature profile of the refrigerated container 102 and consequently the cargo load 108. In the illustrated embodiment, the refrigeration unit 104 includes an evaporator disposed within volume of refrigerated container 102. In the illustrated embodiment, the refrigeration unit 104 can operate in a regular operation mode, wherein the refrigeration unit 104 operates at full power. In the illustrated embodiment, the refrigeration unit 104 can operate in a power saving mode, wherein the refrigeration unit 104 can run at a lower output, a lower speed, a lower duty cycle, or can be shut off completely. In the illustrated embodiment, the temperature response and distribution profile of the refrigeration unit 104 in both modes can be accurately predicted and modeled utilizing the processor 110 and the sensors 106.

In the illustrated embodiment, the cargo load 108 is transported and stored in the refrigerated container 102. In the illustrated embodiment, the refrigerated container 102 is an insulated container to provide thermal isolation and to maintain a desired climate within the volume of the refrigerated container 102. Therefore, in the illustrated embodiment, environmental parameters such as temperature, humidity, etc. are generally controlled within the volume of the refrigerated container 102. In certain embodiments the refrigerated container 102 can be pulled by a tractor. It is understood that embodiments described herein may be applied to shipping containers that are shipped by rail, sea, or any other suitable container, without use of a tractor. In the illustrated embodiment the refrigerated container 102 can include at least one door to allow access to volume within.

In the illustrated embodiment, the cargo identification interface 120 can be a manual interface or an automated interface. In certain embodiments, the cargo identification interface 120 allows for an operator to identify the type of cargo loads 108 placed within the refrigerated container 102 to allow the processor 110 to control the refrigeration unit 104 accordingly. In other embodiments, the cargo identification interface 120 is an automated interface utilizing RFID, UPC bar codes, optical character recognition, object recognition, etc. to identify to the types of cargo within the cargo loads 108. Advantageously, by identifying the cargo loads 108, thermal mass, thermal sensitivity and other properties of the cargo load 108 can be determined. In the illustrated embodiment, operating parameters such as an optimal temperature range, a critical temperature range, an cargo load excursion time limit, can be determined from the cargo load 108 properties. In other embodiments, an operator can input cargo load 108 properties and operating parameters.

In the illustrated embodiment, the sensors 106 can be distributed throughout the volume of the refrigerated container 102. Further, in certain embodiments, the sensors 106 can be affixed to the cargo load 108 or any other suitable location. In certain embodiments, the sensors 106 can provide air temperature values. In certain embodiments, the sensors 106 are evenly distributed throughout the refrigerated container 102 to provide a representative temperature distribution profile within the refrigerated container 102. In certain embodiments, the sensors 106 include surface temperature sensors. In other embodiments, the sensors 106 are infrared temperature sensors. In the illustrated embodiment, the sensors 106 can further provide humidity values.

In the illustrated embodiment, the processor 110 can analyze the cargo load 108 parameters to determine an optimal operation routine that can provide proper cargo load 108 conditions while minimizing energy consumption of the refrigeration unit 104. In the illustrated embodiment, the processor 110 is associated with the cargo database 112, a short range wireless radio 116 and the cargo identification interface 120. In the illustrated embodiment, the processor 110 can identify the cargo load 108, obtain cargo load 108 parameters from the cargo database 112, and operate the refrigeration unit 104 within the cargo load 108 parameters. Advantageously, the processor 110 allows for the refrigeration unit 104 to be operated in an energy efficient manner while maintaining the quality and integrity of the cargo load 108.

In the illustrated embodiment, the cargo load 108 can be determined by the cargo identification interface 120 either via user input or automated routines. In certain embodiments, after the cargo load 108 is identified, cargo load 108 parameters and refrigeration unit 104 operating parameters may be retrieved from the cargo database 112.

In the illustrated embodiment, the cargo database 112 includes records corresponding to various types of cargo loads 108. The cargo database 112 can include same or similar cargo load 108 types or otherwise provide the necessary information for controlling the operation of the refrigeration unit 104. In the illustrated embodiment, the cargo database 112 can provide cargo load 108 parameters. In certain parameters, the cargo database 112 can provide cargo load 108 parameters including but not limited to a cargo thermal sensitivity, a cargo specific heat, a cargo thermal mass, an optimal temperature range, a cargo load excursion time limit, and a critical temperature range. The optimal temperature range may be considered a range of temperatures that the cargo load 108 may remain in indefinitely. In certain embodiments, the cargo load 108 may experience an excursion beyond the optimal temperature range with minimal to no consequences if the excursion is less than the cargo load excursion time limit. The critical temperature range may be considered a temperature range that is damaging to the cargo load 108 regardless of the time of exposure. In certain embodiments, the processor 110 can utilize the cargo load 108 parameters to determine operating parameters for the refrigeration unit 104. In certain embodiments, the processor 110 can analyze a cargo thermal sensitivity, a cargo specific heat, and a cargo thermal mass to determine other characteristics of the cargo load, such as the optimal temperature range and the cargo load excursion time limit.

In certain embodiments, the cargo database 112 can further provide operating parameters for the refrigeration unit 104 corresponding to the cargo load 108. In the illustrated embodiment, the cargo database 112 can include a desired cargo load temperature range and a cargo load excursion time limit. Advantageously, the operating parameters provided by the cargo database 112 may allow for the processor 110 to engage the low power mode of the refrigeration unit 104 for longer periods of time compared to standard operating parameters that do not consider cargo load 108 parameters.

In the illustrated embodiment, the processor 110 can operate the refrigeration unit 104 in accordance with the operating parameters calculated or retrieved from the cargo database 112 to maintain cargo load 108 while minimizing energy use.

In the illustrated embodiment, the processor 110 can receive real time sensor 106 readings from the refrigerated container 102 via a short range wireless radio 116. In the illustrated embodiment, the short range wireless radio 116 allows for communication between the sensors 106 and the processor 110 by utilizing local radio signals, such as Wi-Fi, Bluetooth, near field communication, etc.

In the illustrated embodiment, the sensor 106 readings are analyzed by the processor 110. In the illustrated embodiment, the sensors 106 are disposed throughout the refrigerated container 102, allowing the processor 110 to utilize interpolation or other approximation techniques to determine a temperature distribution within the refrigerated container 102. For example, the processor 110 may utilize known locations of the sensors 106 and approximate temperatures between sensor 106 locations. In certain embodiments, the processor 110 may utilize the sensor 106 values and locations to approximate a two dimensional profile of the temperature distribution within the refrigerated container 102. In other embodiments, three-dimensional approximation may be utilized to approximate a three dimensional profile of the temperature distribution within the refrigerated container 102.

Figure 2:
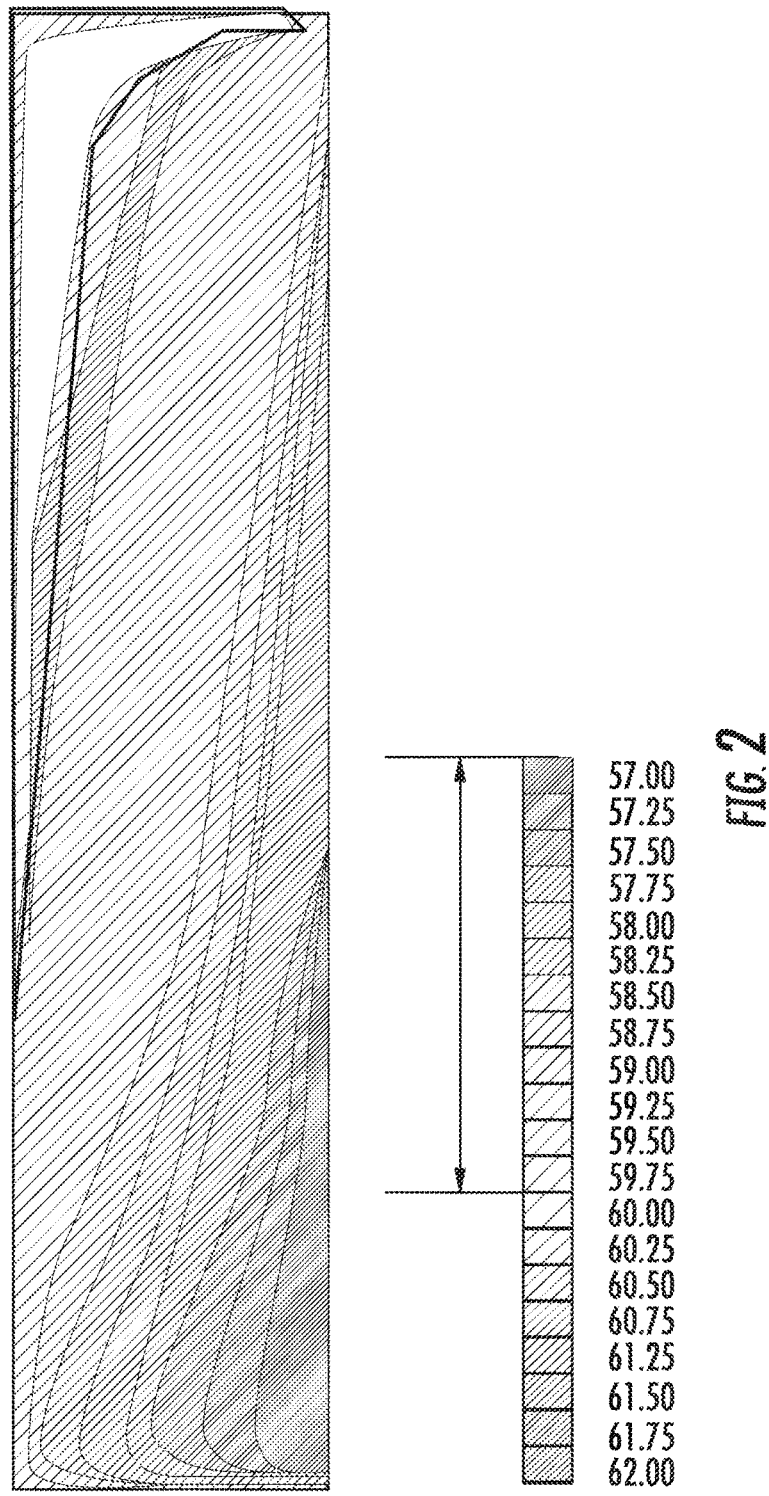
FIG. 2 is a representative view of a temperature distribution of a refrigerated container with a refrigeration unit in a power saving mode.

In the illustrated embodiment, the processor 110 can monitor the temperature distribution within the refrigerated container 102 to determine the operating mode of the refrigeration unit 104. For example, FIG. 2 illustrates a temperature distribution profile of a refrigerated container 102 with the refrigeration unit 104 in a power saving mode. In the illustrated embodiment, the refrigeration unit 104 can operate in a power saving mode while the cargo load 108 temperature is within the optimal temperature range, the cargo load 108 is exposed to temperatures outside the optimal temperature range for longer than the cargo load excursion time limit, or until a temperature in the critical temperature range is experienced. In certain embodiments, the transient behavior of the refrigerated container 104 can be considered, to dispose cargo loads 108 with greater temperature sensitivity in locations within the refrigerated container 104 with less temperature variance. In the illustrated embodiment, the area that is outlined may be considered outside the optimal temperature for a given cargo load 108 and may cause damage to the cargo load 108 if the refrigeration unit 104 remains in the power saving mode long enough to expose the cargo load 108 to temperatures outside the optimal temperature range beyond the cargo load excursion time limit. Advantageously, a refrigeration unit 104 may remain in a power saving mode longer than compared to other operating routines since the processor 110 allows for temperature excursions for the cargo load 108 where permissible.

Figure 3:
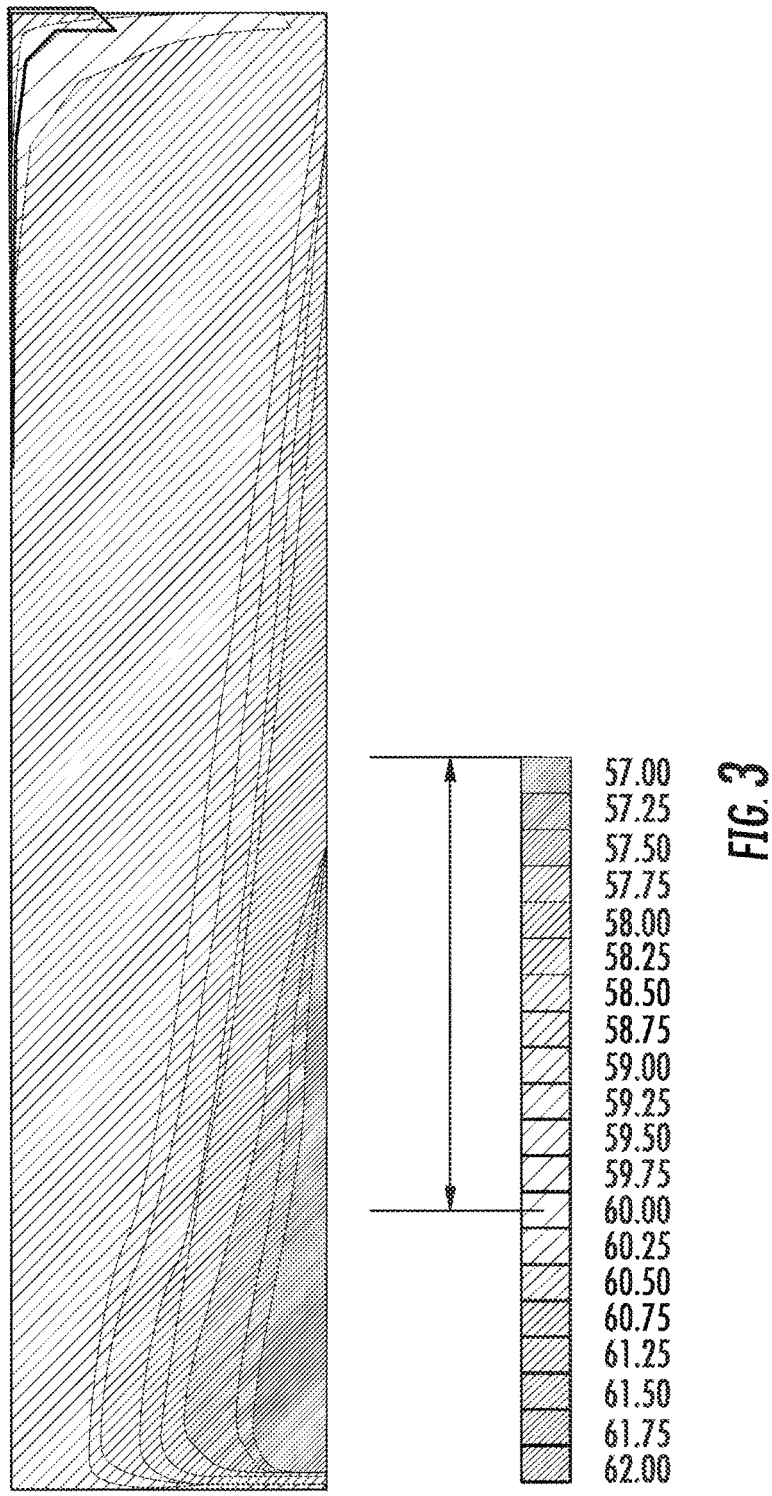
FIG. 3 is a representative view of a temperature distribution of a refrigerated container with a refrigeration unit in a standard mode.

Therefore, in response to the prescribed operating the conditions, the processor 110 may engage the refrigeration unit 104 in a full power or standard mode if a critical temperature range is reached or a cargo load excursion time limit is reached. Referring to FIG. 3, a representative temperature distribution of the refrigerated container 102 with the refrigeration unit 104 operating in a full power mode is shown. In the illustrated embodiment, the area that is outlined that is considered outside of the acceptable range for the cargo load 108 is much smaller than the temperature distribution profile of FIG. 2 and localized to a location away from the cargo load 108. Therefore, in a full power mode, the refrigeration unit 104 can maintain cargo load 108 parameters. In the illustrated embodiment, the processor 110 may engage the full power operating mode of the refrigeration unit 104 until a sufficient thermal inertia or exposure time is achieved.

Figure 4:
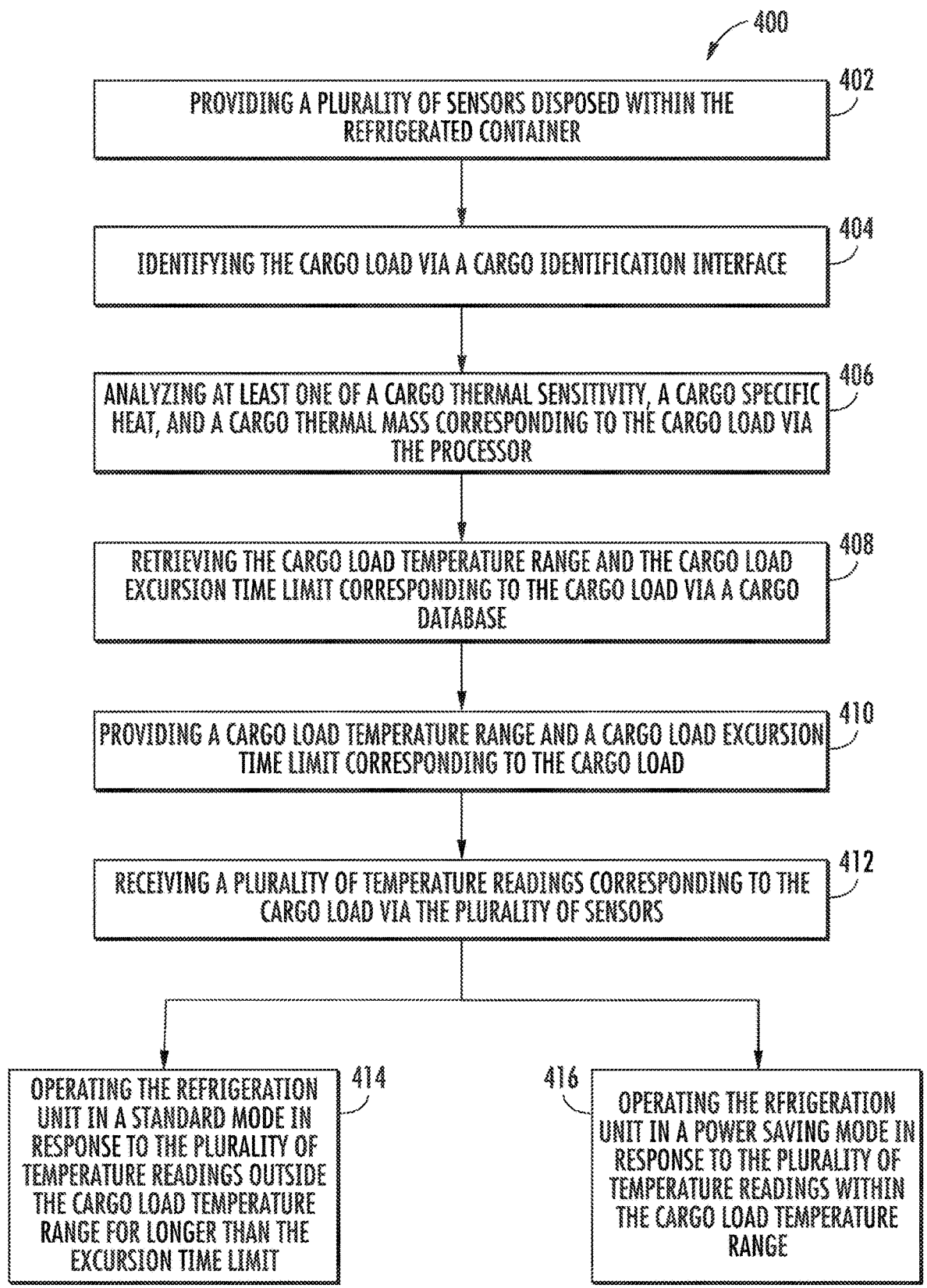
FIG. 4 is a flow diagram of a method of controlling a refrigeration unit in response to a cargo load.

Referring to FIG. 4, a method 400 for controlling a refrigeration unit in response to a cargo load is described. In operation 402, a plurality of sensors disposed within the refrigerated container are provided. In the illustrated embodiment, the sensors can be distributed throughout the volume of the refrigerated container. In certain embodiments, the sensors are evenly distributed throughout the refrigerated container to provide a representative temperature distribution profile within the refrigerated container.

In operation 404, the cargo load is identified via a cargo identification interface. In the illustrated embodiment, the cargo identification interface can be a manual interface or an automated interface. In certain embodiments, the cargo identification interface allows for an operator to identify the type of cargo loads placed within the refrigerated container to allow the processor to control the refrigeration unit accordingly. In other embodiments, the cargo identification interface is an automated interface utilizing RFID, UPC bar codes, optical character recognition, object recognition, etc. to identify to the types of cargo within the cargo loads.

In operation 406, at least one of a cargo thermal sensitivity, a cargo specific heat, and a cargo thermal mass corresponding to the cargo load is analyzed via the processor. In certain embodiments, the processor can analyze a cargo thermal sensitivity, a cargo specific heat, and a cargo thermal mass to determine other characteristics of the cargo load, such as the optimal temperature range and the cargo load excursion time limit. In the illustrated embodiment, the initial cargo characteristics can be analyzed before performing other steps of the method. Further, in the illustrated embodiment, cargo characteristics can be continuously or periodically analyzed during execution of the method.

In operation 408, the cargo load temperature range and the cargo load excursion time limit corresponding to the cargo load is retrieved via a cargo database. Advantageously, the operating parameters provided by the cargo database may allow for the processor to engage the low power mode of the refrigeration unit for longer periods of time compared to standard operating parameters that do not consider cargo load parameters. In operation 410, a cargo load temperature range and a cargo load excursion time limit corresponding to the cargo load is provided. In operation 412, a plurality of temperature readings corresponding to the cargo load are received via the plurality of sensors.

In operation 414, the refrigeration unit is operated in a standard mode in response to the plurality of temperature readings outside the cargo load temperature range for longer than the cargo load excursion time limit. In the illustrated embodiment, in a full power mode, the refrigeration unit can maintain cargo load parameters. In the illustrated embodiment, the processor may engage the full power operating mode of the refrigeration unit until a sufficient thermal inertia or exposure time is achieved. In the illustrated embodiment, the cargo characteristics can continue to be recursively analyzed by performing operation 406 before performing operations 408, 410, and 412 before selectively performing operations 414 or 416. In certain embodiments, the cargo characteristics can continue to be analyzed and the refrigeration unit can be operated in response to the cargo characteristics for the duration of a trip or as required.

In operation 416, the refrigeration unit is operated in a power saving mode in response to the plurality of temperature readings within the cargo load temperature range. In the illustrated embodiment, the refrigeration unit can operate in a power saving mode while the cargo load 108 temperature is within the optimal temperature range, the cargo load 108 is exposed to temperatures outside the optimal temperature range for longer than the cargo load excursion time limit, or until a temperature in the critical temperature range is experienced. In the illustrated embodiment, the cargo characteristics can continue to be recursively analyzed by performing operation 406 before performing operations 408, 410, and 412 before selectively performing operations 414 or 416. In certain embodiments, the cargo characteristics can continue to be analyzed and the refrigeration unit can be operated in response to the cargo characteristics for the duration of a trip or as required.

The terminology used herein is for the purpose of describing particular embodiments only and is not intended to be limiting of the embodiments. While the description of the present embodiments has been presented for purposes of illustration and description, it is not intended to be exhaustive or limited to the embodiments in the form disclosed. Many modifications, variations, alterations, substitutions or equivalent arrangement not hereto described will be apparent to those of ordinary skill in the art without departing from the scope of the embodiments. Additionally, while various embodiments have been described, it is to be understood that aspects may include only some of the described embodiments. Accordingly, the embodiments are not to be seen as limited by the foregoing description, but are only limited by the scope of the appended claims.

What is claimed is:

1. A system to control a refrigeration unit in response to a cargo load in a refrigerated container, the system comprising:
    a plurality of sensors disposed within the refrigerated container, the plurality of sensors to provide a plurality of temperature readings, the plurality of sensors distributed through a volume of the refrigerated container to provide a representative temperature distribution profile within the refrigerated container; and
    a processor configured to:
    identify the cargo load in response to a cargo identification interface;
    analyze at least one of a cargo thermal sensitivity, a cargo specific heat, and a cargo thermal mass;
    obtain a cargo load temperature range and a cargo load excursion time limit in response to analyzing at least one of the cargo thermal sensitivity, the cargo specific heat, and the cargo thermal mass;
    operate the refrigeration unit in a power saving mode in response to the plurality of temperature readings within the cargo load temperature range and to operate the refrigeration unit in a standard mode in response to the plurality of temperature readings outside the cargo load temperature range for longer than the cargo load excursion time limit.

2. The system of claim 1, further comprising a cargo identification interface to identify the cargo load.

3. The system of claim 1, further comprising a cargo database including the cargo load temperature range and the cargo load excursion time limit corresponding to the cargo load.

4. The system of claim 1, wherein at least one sensor of the plurality of sensors is an infrared temperature sensor.

5. The system of claim 1, wherein at least one sensor of the plurality of sensors is a surface temperature sensor.

* * * * *